UNITED STATES PATENT OFFICE.

WILHELM NEELMEIER AND AUGUST SIGWART, OF LEVERKUSEN, NEAR COLOGNE, GERMANY, ASSIGNORS TO SYNTHETIC PATENTS CO., INC., OF NEW YORK, N. Y., A CORPORATION OF NEW YORK.

AZO COLORING-MATTERS.

1,128,814.    Specification of Letters Patent.    Patented Feb. 16, 1915.

No Drawing.    Application filed February 25, 1914.    Serial No. 820,884.

*To all whom it may concern:*

Be it known that we, WILHELM NEELMEIER and AUGUST SIGWART, doctors of philosophy, chemists, citizens of the German Empire, residing at Leverkusen, near Cologne-on-the-Rhine, Germany, have invented new and useful Improvements in Azo Coloring-Matters, of which the following is a specification.

We have found that new and valuable azo dyestuffs can be obtained on starting from a derivative of the 2-naphthol-6-sulfonic acid having most probably the following general formula:

R meaning an organic amino radical which does further couple in these combinations with a diazo compound such as of an aminophenol, chloroaminophenol, meta-phenylenediamin, aminonaphthol, aminonaphthol-mono-, di- or polysulfonic acid, etc. The above mentioned hitherto unknown derivatives of the 2-naphthol-6-sulfonic acid can be obtained by condensing the sulfonyl chlorid of the 2-naphthol-1-carboxylic acid with aminophenols, aminonaphthols or aminonaphthol sulfonic acids, etc., and splitting off the carboxylic group. In case the products which still contain this group are coupled the carboxylic group is eliminated in the process of combination. These compounds can be combined with two molecules of a diazo compound, diazoazo compound or a tetrazo compound, or an intermediate product from a tetrazo compound and one molecule of an azo-dyestuff component.

The new coloring matters dye wool from an acid bath in orange-red to blue to black shades fast to light, to milling and to washing. The dyestuffs of this group as far as they can be after treated with chromates change into bluer tints remarkable for their excellent fastness to milling and washing. They are after being dried and pulverized generally from reddish to black powders soluble in water and in concentrated sulfuric acid generally with a reddish to brownish-black coloration. They yield upon reduction with zinc powder and acetic acid an amino-2-naphthol-6-sulfonic acid compound substituted in the sulfonic group by an aromatic radical containing a diazotizable amino group, *e. g.* the radicals above specified.

In order to illustrate the new process more fully the following example is given, the parts being by weight:—525 parts of the condensation product with 1-amino-8-naphthol-4.6-disulfonic acid:

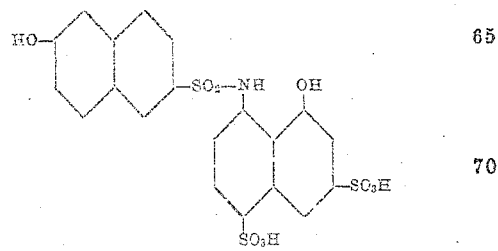

are dissolved in soda in excess and the diazo solution obtained from 186 parts (2 molecules) of anilin is added to this solution while it is being stirred. When the dyestuff is completely formed it is salted out, collected on a filter and dried. The dyestuff is a brownish-red powder which yields on wool a pure yellowish-scarlet of good fastness to light, sulfur and milling. It has in a free state most probably the formula:

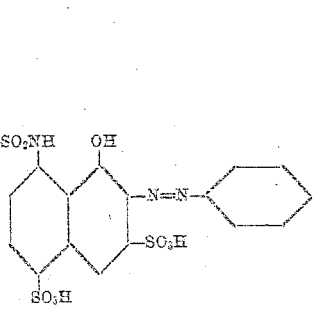

and is in the shape of its sodium salt soluble in water and in concentrated sulfuric acid with a reddish coloration and yields upon reduction with zinc powder and acetic acid anilin and 1-amino-2-naphthol-6-sulfonic acid substituted in the sulfonic group by the residue of 1.7-diamino-8-naphthol-4.6-disulfonic acid.

Similar dyestuffs are obtained by replacing in the condensation product the 1-amino-8-naphthol-4.6-disulfonic acid by the 1-amino-8-naphthol-3.6-disulfonic acid, while the condensation product with the 2-amino-5-naphthol-7-sulfonic acid yields more yellowish dyestuffs.

Instead of the condensation products with the before mentioned aminonaphthol sulfonic acids condensation products of other aminonaphthol sulfonic acids with the sulfonychlorid of the 2-naphthol-1-carboxylic acid may be used, furthermore condensation products with the aminonaphthols themselves, for instance with 1-amino-7-naphthol. Other diazo compounds may be used e. g. ortho-toluidin, xylidin, etc.

We claim:—

1. The new azo dyes which are after being dried and pulverized generally from reddish to black powders soluble in water and in concentrated sulfuric acid generally with a reddish to brownish-black coloration; yielding upon reduction with zinc powder and acetic acid an amino-2-naphthol-6-sulfonic acid compound substituted in the sulfonic group by an organic radical containing a diazotizable amino group; and dyeing wool from an acid bath generally from orange-red to blue to black shades fast to milling, substantially as described.

2. The new azo dyes which are after being dried and pulverized generally from reddish to black powders soluble in water and in concentrated sulfuric acid generally with a reddish to brownish-black coloration; yielding upon reduction with zinc powder and acetic acid an amino-2-naphthol-6-sulfonic acid compound substituted in the sulfonic group by the radical of an aminonaphthol containing a diazotizable amino group; and dyeing wool from an acid bath generally from orange-red to blue to black shades fast to milling, substantially as described.

3. The new azo dyes which are after being dried and pulverized generally from reddish to black powders soluble in water and in concentrated sulfuric acid generally with a reddish to brownish-black coloration; yielding upon reduction with zinc powder and acetic acid an amino-2-naphthol-6-sulfonic acid compound substituted in the sulfonic group by the radical of an aminonaphthol sulfonic acid containing a diazotizable amino group; and dyeing wool from an acid bath generally from orange-red to blue to black shades fast to milling, substantially as described.

4. The new azo dyes which are after being dried and pulverized generally from reddish to black powders soluble in water and in concentrated sulfuric acid generally with a reddish to brownish-black coloration; yielding upon reduction with zinc powder and acetic acid an amino-2-naphthol-6-sulfonic acid compound substituted in the sulfonic group by the radical of an aminonaphthol di-sulfonic acid containing a diazotizable amino group; and dyeing wool from an acid bath generally from orange-red to blue to black shades fast to milling, substantially as described.

5. The new azo dye having in a free state most probably the formula:

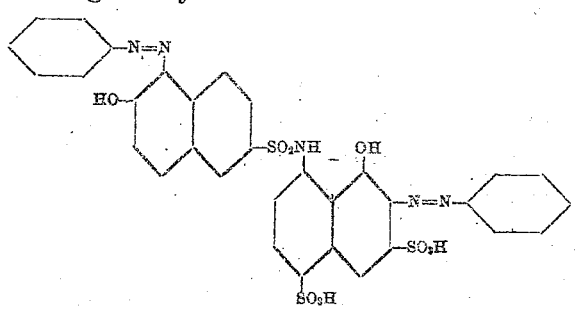

which dye is after being dried and pulverized in the shape of its sodium salt a brownish-red powder soluble in water and in concentrated sulfuric acid with a reddish coloration; yielding upon reduction with zinc powder and acetic acid 1-amino-2-naphthol-6-sulfonic acid substituted in the sulfonic group by the residue of 1.7-diamino-8-naphthol-4.6-disulfonic acid; and dyeing wool from an acid bath in yellowish-scarlet fast to light, sulfur and milling, substantially as described.

In testimony whereof we have hereunto set our hands in the presence of two subscribing witnesses.

WILHELM NEELMEIER.
AUGUST SIGWART.

Witnesses:
 HANS BRÜCKNER,
 MARTIN HERZBERG.